(12) United States Patent
Yamashita et al.

(10) Patent No.: US 10,860,160 B2
(45) Date of Patent: Dec. 8, 2020

(54) DISPLAY CONTROL DEVICE, DISPLAY CONTROL METHOD, AND DISPLAY CONTROL SYSTEM

(71) Applicant: ISUZU MOTORS LIMITED, Tokyo (JP)

(72) Inventors: Akira Yamashita, Kawasaki (JP); Keisuke Kimura, Kawasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/059,956

(22) Filed: Aug. 9, 2018

(65) Prior Publication Data

US 2019/0050092 A1  Feb. 14, 2019

(30) Foreign Application Priority Data

Aug. 10, 2017  (JP) .................................. 2017-154949

(51) Int. Cl.
   *G06F 3/048*  (2013.01)
   *G08G 1/00*  (2006.01)
   *G06Q 50/30*  (2012.01)

(52) U.S. Cl.
   CPC ............ *G06F 3/048* (2013.01); *G06Q 50/30* (2013.01); *G08G 1/00* (2013.01); *G08G 1/20* (2013.01)

(58) Field of Classification Search
   CPC ................................. G06F 3/048; G06Q 50/30
   See application file for complete search history.

(56) References Cited

U.S. PATENT DOCUMENTS

| 6,339,745 B1* | 1/2002 | Novik .................... G07C 5/008 342/357.31 |
| 2006/0099959 A1* | 5/2006 | Staton ..................... B60R 25/33 455/456.1 |
| 2014/0123183 A1* | 5/2014 | Fujimoto .............. G06F 3/0482 725/37 |

FOREIGN PATENT DOCUMENTS

| JP | 2010236910 A | * 10/2010 |
| JP | 2013-246748 A | 12/2013 |

OTHER PUBLICATIONS

JP2010236910—English translation (Year: 2010).*

(Continued)

*Primary Examiner* — Abby Y Lin
*Assistant Examiner* — Renee LaRose
(74) *Attorney, Agent, or Firm* — Procopio, Cory, Hargreaves & Savitch LLP

(57) ABSTRACT

A display control device including: an acquiring unit configured to acquire location information items representing locations of each of a plurality of vehicles and a plurality of status information items representing statuses of each of the plurality of vehicles, the plurality of vehicles being registered in advance in association with a user using a user terminal; a setting receiving unit configured to receive a display condition set by the user; and a display control unit configured to display a map image on the user terminal such that an icon image representing a vehicle whose status information item satisfies the display condition is positioned at the center of the map image and a position of the icon image of the vehicle in the map image corresponds to the location of the vehicle represented by the location information item.

9 Claims, 8 Drawing Sheets

(56) References Cited

OTHER PUBLICATIONS

"Isuzu carries out full model change of commercial vehicle telematics "Mimamori"", Published May 8, 2017, English language machine translation provided; URL: http://www.isuzu.co.jp/press/2017/5_8prs.html.; 6 pages.

* cited by examiner

DISPLAY CONTROL DEVICE, DISPLAY CONTROL METHOD, AND DISPLAY CONTROL SYSTEM

STATEMENT REGARDING PRIOR DISCLOSURES BY THE INVENTORS

The inventors of the present application authored and disclosed the subject matter of the present application on May 8, 2017. The prior disclosures have been submitted in an Information Disclosure Statement in the present application as "Isuzu carries out full model change of commercial vehicle telematics "MIMAMORI"" (Published May 8, 2017; retrieved on Jul. 25, 2018; English language machine translation provided); URL: http://www.isuzu.co.jp/press/2017/5_8prs.html."

CROSS-REFERENCE TO RELATED APPLICATIONS

This application claims priority from Japanese Patent Application No. 2017-154949 filed on Aug. 10, 2017, the entire contents of which are incorporated herein by reference.

TECHNICAL FIELD

The disclosure relates to a display control device, a display control method, and a display control system for displaying information on vehicles.

BACKGROUND

There are known technologies for displaying a map image including information on vehicles and images showing locations of the vehicles on a display of a computer for vehicle operation management. In the case where it is necessary to manage a plurality of vehicles, since the amount of information is large, it is required to display information on the vehicles on a map image such that a user can easily see the displayed information.

According to a technology disclosed in JP-A-2013-246748, in the case where there is a plurality of vehicles to display, an image of a vehicle having a smallest vehicle number is displayed at the center of a map image, together with information on the vehicle. Thereafter, whenever a button on the screen is operated, the next vehicle is displayed in sequential order.

However, according to the technology disclosed in JP-A-2013-246748, since the order in which the vehicles are displayed at the center is fixed, it is impossible to select a vehicle such that the vehicle is displayed at the center together with information on the vehicle. Therefore, there is a problem that it is difficult to find a vehicle which a user is giving attention to, among a plurality of vehicles, and make information on the vehicle to be displayed.

SUMMARY

The disclosure is made in view of the above-mentioned circumstances, and an object of the disclosure is to provide a display control device, a display control method, and a display control system capable of displaying a map image including information on a plurality of vehicles such that a user can easily see information on a desired vehicle.

According to an aspect of the disclosure, there is provided a display control device including: an acquiring unit configured to acquire location information items representing locations of each of a plurality of vehicles and a plurality of status information items representing statuses of each of the plurality of vehicles, the plurality of vehicles being registered in advance in association with a user using a user terminal; a setting receiving unit configured to receive a display condition set by the user; and a display control unit configured to display a map image on the user terminal such that an icon image representing a vehicle whose status information item satisfies the display condition is positioned at the center of the map image and a position of the icon image of the vehicle in the map image corresponds to the location of the vehicle represented by the location information item.

According to another aspect of the disclosure, there is provided a display control method including: acquiring location information items representing locations of each of a plurality of vehicles and a plurality of status information items representing statuses of each of the plurality of vehicles, the plurality of vehicles registered in advance in association with a user using a user terminal; receiving a display condition set by the user; and displaying a map image on the user terminal such that an icon image representing a vehicle whose status information item satisfies the display condition is positioned at the center of the map image and a position of the icon image of the vehicle in the map image corresponds to the location of the vehicle represented by the location information item.

According to another aspect of the disclosure, there is provided a display control system including: a user terminal; and a display control device configured to display a status of a vehicle on the user terminal, wherein the display control device includes: an acquiring unit configured to acquire location information items representing locations of each of a plurality of vehicles and a plurality of status information items representing the statuses of each of the plurality of vehicles, the plurality of vehicles being registered in advance in association with a user using the user terminal; and a setting receiving unit configured to receive a display condition set by the user, and wherein the user terminal includes a display unit configured to display a map image such that an icon image representing a vehicle whose status information item satisfies the display condition is positioned at the center of the map image and a position of the icon image of the vehicle in the map image corresponds to the location of the vehicle represented by the location information item.

According to the disclosure, it is possible to display a map image including information on a plurality of vehicles such that a user can easily see information on desired vehicles.

DETAILED DESCRIPTION

First Embodiment

Figure 1:
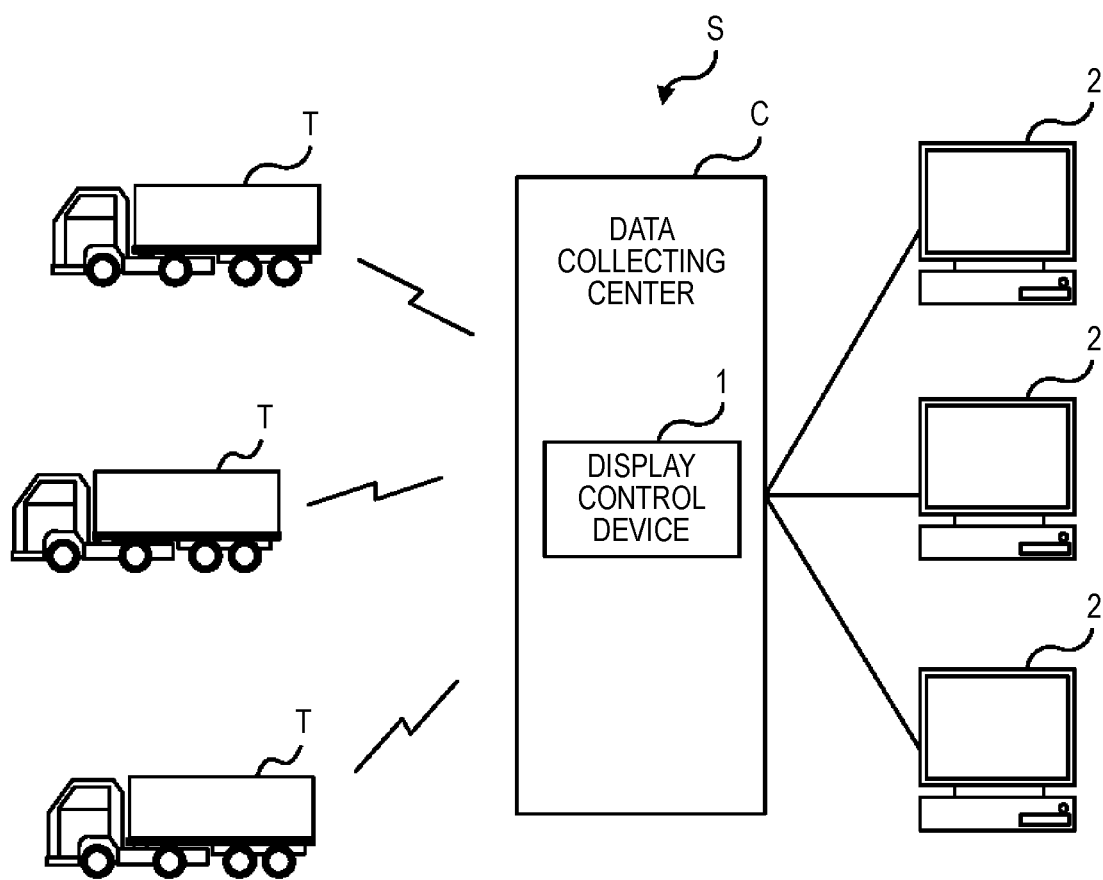
FIG. 1 is a schematic diagram illustrating a display control system according to a first embodiment.

FIG. 1 is a schematic diagram illustrating a display control system S according to the present embodiment. The display control system S is a system in which a display control device 1 and vehicles T cooperate to display information on the vehicles T. The display control device 1 is installed in a data collecting center C collecting data representing the locations of various vehicles T. The display control device 1 is connected to a plurality of vehicles T which are registered in advance in the display control device 1, via a wireless communication channel, and receives data representing the location information and status information of the individual vehicles T from the vehicles T at intervals of a predetermined time. Based on the location data received from the vehicles T, the display control device 1 manages the operations of the vehicles T.

The display control device 1 is connected to user terminals 2 for users such as managers and so on via a network (for example, the Internet). The user terminals 2 may be installed in facilities of companies owning the vehicles T and companies maintaining the vehicles T, or may be installed in facilities of the owners of cargos which are transported by the vehicles T. Each user terminal 2 displays information on vehicles T received from the display control device 1. Also, in response to user's inputs, each user terminal 2 sets display conditions and display targets, in the display control device 1.

Configuration of Display Control System S

Figure 2:
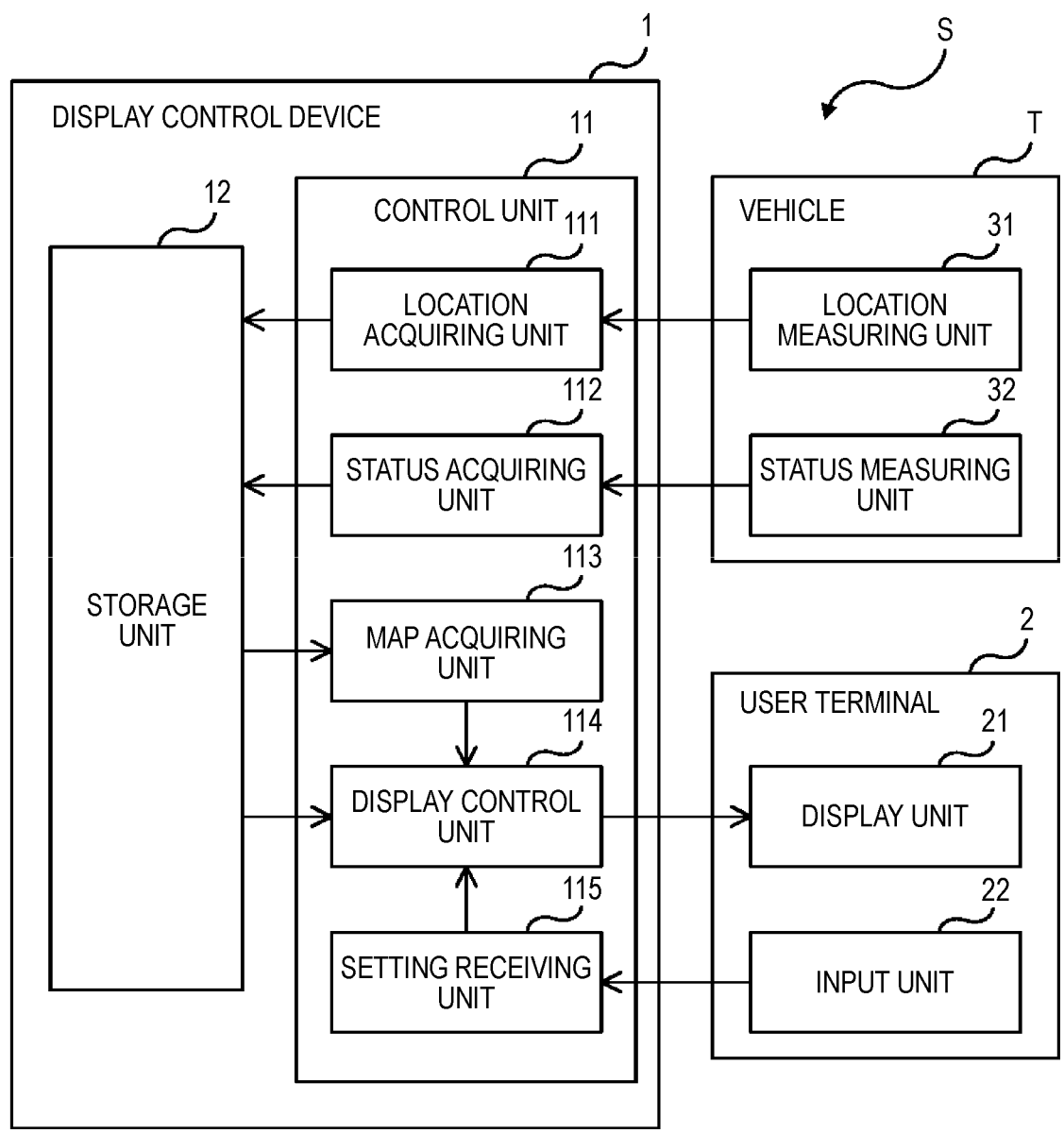
FIG. 2 is a block diagram illustrating the display control system according to the first embodiment.

FIG. 2 is a block diagram illustrating the display control system S according to the present embodiment. In FIG. 2, arrows represent main data flows, and data flows other than those shown in FIG. 2 may exist. In FIG. 2, each of blocks represents a component which is a function unit, not a component which is a hardware unit (a device). Therefore, the blocks shown in FIG. 2 may be installed in a single device, or may be divided in a plurality of devices. Data communication of the blocks may be performed via arbitrary means such as data buses, networks, portable storage media, and so on.

Each user terminal 2 includes a display unit 21 and an input unit 22. The display unit 21 includes a display device, such as a liquid crystal display or an organic electroluminescent display (OELD), capable of displaying information received from the display control device 1 such that the user can see that information. The input unit 22 includes input devices, such as a keyboard, a mouse, and so on, capable of receiving user's inputs. Also, as the display unit 21, a touch screen may be used, in which the display unit 21 and the input unit 22 are integrated into one. The input unit 22 transmits input information representing user's inputs to the display control device 1 via a network.

Each vehicle T includes a location measuring unit 31 and a status measuring unit 32. The location measuring unit 31 includes, for example, a GPS (Global Positioning System) receiver, and measures the location of the vehicle T by receiving signals from GPS satellites. The location measuring unit 31 transmits location information representing the location of the vehicle T measured and the measurement time of the location, to the display control device 1 via the wireless communication channel. The location measuring unit 31 measures the location at intervals of a predetermined time. Whenever the location is measured, the location measuring unit may transmit the location at that point in time. Alternatively, the location measuring unit may transmit information on the locations measured at a plurality of points in time, at once.

The status measuring unit 32 measures the statuses of the vehicle T by collecting signals from various sensors mounted on the vehicle T. The statuses of the vehicle T include, for example, the vehicle velocity, the traveling direction, the speed of the engine, the status of the ignition switch (also referred to simply as the ignition), the temperature of a part of the vehicle T, whether a door is opened or closed, and so on. On the vehicle T, sensors corresponding to statuses to measure are mounted. The status measuring unit 32 transmits status information representing the statuses of the vehicle T measured, via the wireless communication channel.

The display control device 1 includes a control unit 11 and a storage unit 12. The control unit 11 includes a location acquiring unit 111, a status acquiring unit 112, a map acquiring unit 113, a display control unit 114, and a setting receiving unit 115.

The storage unit 12 is a recording medium including a ROM (Read Only Memory), a RAM (Random Access Memory), a hard disk drive, and so on. In the storage unit 12, programs to be executed by the control unit 11 are stored in advance. Further, in the storage unit 12, map information for displaying a map image is recorded in advance. Also, in the storage unit 12, location information and status information on vehicles T which are acquired by the location acquiring unit 111 and the status acquiring unit 112 (to be described below) are stored.

The control unit 11 is a processor such as a CPU (Central Processing Unit), and serves as the location acquiring unit 111, the status acquiring unit 112, the map acquiring unit 113, the display control unit 114, and the setting receiving unit 115 by executing a program stored in the storage unit 12. At least some of the functions of the control unit 11 may be performed by electric circuits. Also, at least some of the functions of the control unit 11 may be performed by a program which is executed via a network.

The display control unit 114 and the user terminals 2 according to the present embodiment are not limited to the specific configurations shown in FIG. 2. Each of the display control device 1 and the user terminals 2 is not limited to one device, and may be configured by connecting two or more physically separate devices by cable or in a wireless manner.

Description of Configuration for Displaying Information on Vehicle T

In the storage unit 12, each of users (specifically, the identification information of each user) and vehicle-specific information representing static information on vehicles T, such as the vehicle numbers identifying the vehicles T, the names of crews of the vehicles T, and so on are stored in association with each other in advance.

The location acquiring unit 111 acquires location information, representing the locations of the vehicles T and the times at which the locations are measured, received from the vehicle T at intervals of a predetermined time. However, regardless of the time intervals, the location acquiring unit 111 may transmit a location information request to the vehicles T, and receive location information as responses to that request from the vehicles T. The location acquiring unit 111 stores the acquired location information in the storage unit 12 in association with the vehicle-specific information of the vehicles T.

The status acquiring unit 112 acquires status information representing the statuses of the vehicle T received from the vehicles T at intervals of a predetermined time. However, regardless of the time intervals, the status acquiring unit may transmit a status information request to the vehicles T, and receive status information as responses to that request from the vehicles T. The status acquiring unit 112 stores the acquired status information in the storage unit 12 in association with the vehicle-specific information of the vehicles T.

The map acquiring unit 113 acquires the map information for displaying the map image by reading the storage unit 12. As map information, a map image may be used, or vectorial data for generating a map image may be used. In the case of using vectorial data as map information, the display control device 1 or each user terminal 2 generates a map image based on the vectorial data.

The display control unit 114 reads out the vehicle-specific information, location information, and status information of vehicles T associated with each user from the storage unit 12, and transmits the read information to a user terminal 2, such that a vehicle display screen displaying the information on the vehicles T is displayed on the display unit 21 of the user terminal 2. Also, the display control unit 114 transmits the map information acquired by the map acquiring unit 113 to each user terminal 2 such that the map image based on the map information is displayed on the vehicle display screen.

Figure 3:
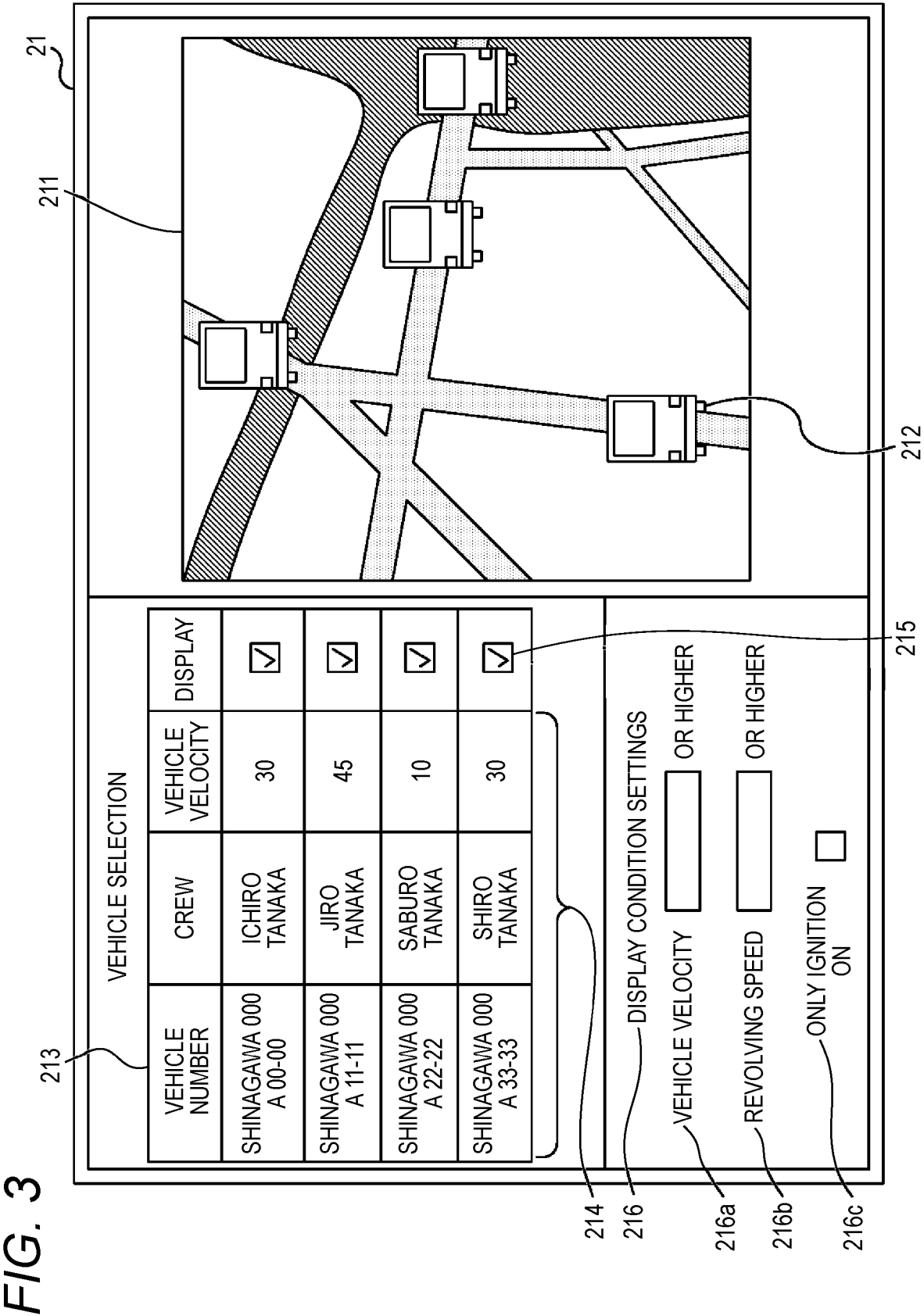
FIG. 3 is a front view illustrating a display unit displaying a vehicle display screen according to the first embodiment.

FIG. 3 is a front view illustrating a display unit 21 displaying a vehicle display screen before display condition setting. The vehicle display screen includes a map image 211, icon images 212, a vehicle list 213, vehicle information 214, display checkboxes 215, and display condition fields 216.

The display control unit 114 displays a map image 211 showing a predetermined display range of the map information acquired by the map acquiring unit 113 at a predetermined scale. The display control unit 114 sets, for example, a range including the locations of all vehicles T associated with the user using the user terminal 2, as the display range of the map image 211. Also, the display control unit 114 sets, for example, such a maximum scale which a range including the locations of all vehicles T associated with the user using the user terminal 2 can fit on the vehicle display screen (i.e. the largest scale), as the scale of the map image 211.

Also, in the case where the user performs a predetermined operation on the map image 211 by operating the input unit 22 (for example, by clicking or dragging the mouse), in response to that operation, the display control unit 114 may move the display range of the map image 211, or may change the scale of the map image 211.

The display control unit 114 displays the icon images 212 of the vehicles T at positions on the map image 211 corresponding to the locations of the vehicles T represented by the location information acquired by the location acquiring unit 111. More specifically, the display control unit 114 converts the locations represented by the location information into coordinates on the map image 211, and displays the icon images 212 on the obtained coordinates. The icon images 212 may be photos of the vehicles T, or may be pictures showing the vehicles T, or may be simple marks such as circles, rectangles, and so on.

The display control unit 114 displays a list of all vehicles T associated with the user using the user terminal 2, as the vehicle list 213. The vehicle list 213 includes the vehicle information 214 and the display checkboxes 215 related to the individual vehicles T. The vehicle information 214 is arbitrary information (in the example of FIG. 3, vehicle numbers, crew names, and vehicle velocities) of the vehicle-specific information read out from the storage unit 12 and the status information acquired by the status acquiring unit 112. The user may arbitrarily set the kinds of information to be displayed as vehicle information 214 by operating the input unit 22.

The display checkboxes 215 are checkboxes for selecting whether to display the icon image 212 of each of the vehicles T on the map image 211. If the user checks a display checkbox 215 by operating the input unit 22, a vehicle T associated with the checked display checkbox 215 is displayed on the map image; whereas if the user unchecks a display checkbox 215, a vehicle T associated with the unchecked display checkbox 215 is not displayed on the map image.

The display condition fields 216 include a vehicle velocity field 216a, a revolving speed field 216b, and an ignition checkbox 216c. The vehicle velocity field 216a is a field for inputting a lower limit value of vehicle velocity as a display condition. The revolving speed field 216b is a field for inputting an engine speed as a display condition. The user inputs display condition values in the vehicle velocity field 216a and the revolving speed field 216b, respectively, by operating the input unit 22. In the example of FIG. 3, in each of the vehicle velocity field 216a and the revolving speed field 216b, only a lower limit value can be set; however, only an upper limit value may be set, or both of a lower limit value and an upper limit value may be set. In other words, the vehicle velocity field 216a and the revolving speed field 216b are fields for setting values defining display condition ranges.

The ignition checkbox 216c is a field for selecting whether to display only vehicles T in which their ignition switches are on. If the user checks the ignition checkbox 216c by operating the input unit 22, only vehicles T in which their ignition switches are on are displayed; whereas if the user unchecks the ignition checkbox, vehicles T are displayed regardless of whether their ignition switches are on. In the example of FIG. 3, the ignition checkbox 216c uses the display condition that ignition switches should be on; however, it may use a display condition that ignition switches should be off.

In the present embodiment, as display conditions, vehicle velocity, engine speed, and ignition switch status are used; however, display conditions are not limited thereto. As display conditions, other statuses of the vehicles T which are represented by status information which is acquired by the status acquiring unit 112 can be used. For example, temperature and whether a door is opened or closed can be used as display conditions. Also, for example, it is possible to determine whether each of the vehicles T is broken, based on status information, and use the determination results as display conditions. The display condition fields 216 include arbitrary fields corresponding to statuses of the vehicles T usable as display conditions.

If the user inputs a display condition in any one of the display condition fields 216 by operating the input unit 22, the input unit 22 transmits the input content as input information to the display control device 1. The setting receiving unit 115 of the display control device 1 receives the display condition set by the user, based on the input information received from the user terminal 2, and transmits the information to the display control unit 114. Then, the display control unit 114 extracts a vehicle T satisfying the display condition received by the setting receiving unit 115. Subsequently, the display control unit displays the icon image 212 of the extracted vehicle T at the center of the map image 211, like a vehicle display screen after display condition setting, shown in FIG. 4.

Figure 4:
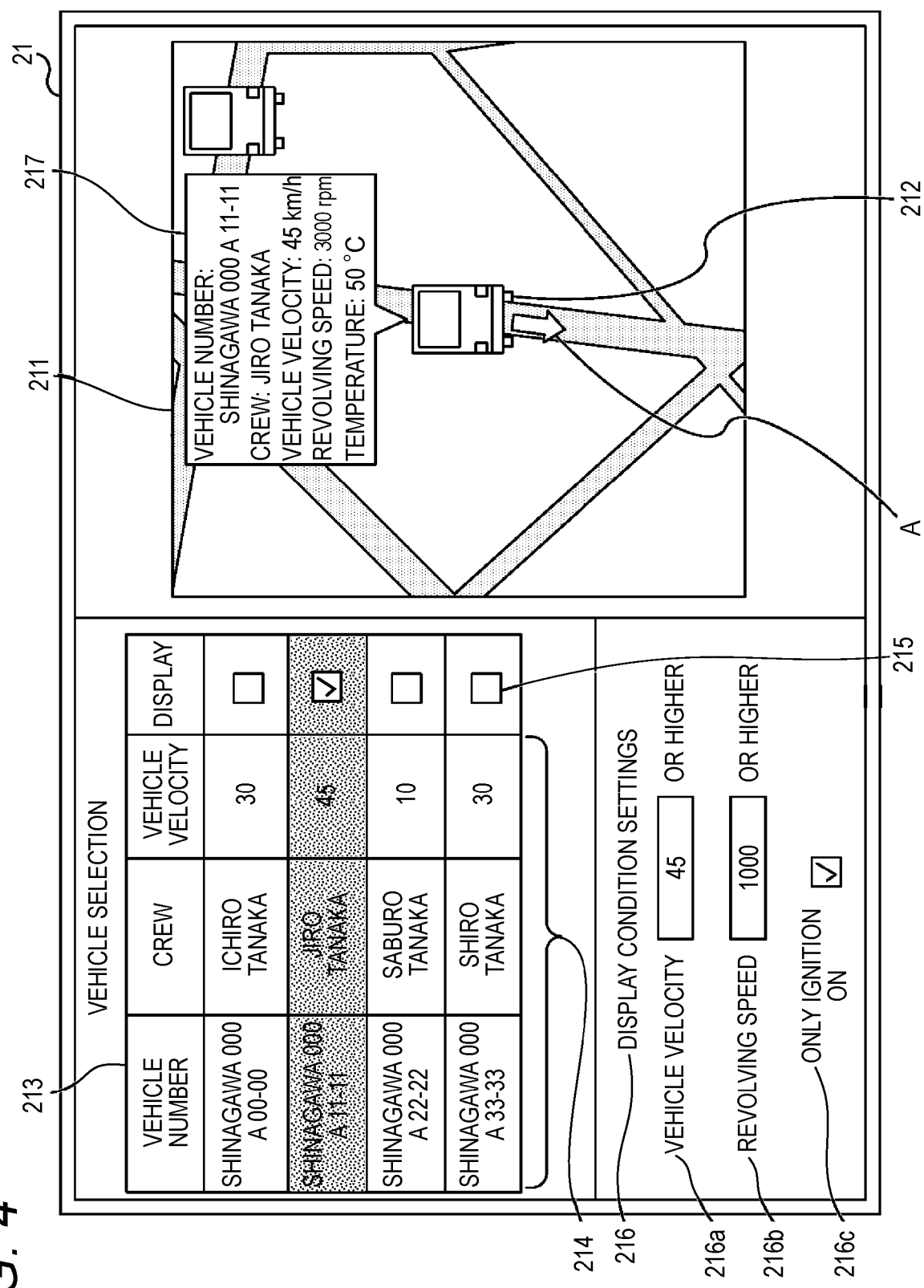
FIG. 4 is a front view illustrating the display unit displaying a vehicle display screen according to the first embodiment.

FIG. 4 is a front view illustrating the display unit 21 displaying a vehicle display screen after display condition setting. The display control unit 114 extracts a vehicle T satisfying display conditions, and displays the vehicle information 214 of the extracted vehicle T included in the vehicle list 213, in a display mode different from that of the vehicle information 214 of the other vehicles T. In the example of FIG. 4, an area showing the vehicle information 214 of a vehicle T satisfying display conditions is displayed in a color different from the color of areas showing the vehicle information 214 of vehicles T which do not satisfy the display conditions. The method of changing the display mode of vehicle information 214 is not limited thereto. Alternatively, the appearance such as color, thickness, shape, or the like of character strings representing vehicle information 214 may be changed, or character strings or an area showing vehicle information 214 may be blinked.

The user checks the display checkboxes 215 of vehicles T which are display targets and unchecks the display checkboxes 215 of vehicles T which are not display targets, by operating the input unit 22. In this way, the user can select vehicles T to be displayed. Alternatively, the display control unit 114 may automatically check the display checkboxes 215 of vehicles T satisfying display conditions and uncheck the display checkboxes 215 of the other vehicles T.

If the user checks a display checkbox 215 by operating the input unit 22, the input unit 22 transmits the input content as input information to the display control device 1. The setting receiving unit 115 of the display control device 1 receives the display target selection set by the user, based on the input information received from the user terminal 2, and transmits the information to the display control unit 114. Then, the display control unit 114 disposes the icon image 212 of the vehicle T selected as a display target by the user's checking on the display checkbox 215, at the center of the map image 211. Here, the center of the map image 211 means the center of the display range of the map image 211 or an area close to the center.

In the case where the user selects a plurality of vehicles T by checking their display checkboxes 215, the display control unit 114 selects one vehicle T of the plurality of vehicles T according to a predetermined rule, and disposes the selected vehicle at the center of the map image 211. Example of the rule for selecting a vehicle T include rules that a vehicle T having the smallest or largest vehicle number should be selected, rules that a vehicle having the lowest or highest vehicle velocity should be selected, and rules that a vehicle having the lowest or highest engine speed should be selected.

The vehicle list 213 may be configured such that if the user selects the vehicle information 214 of a vehicle T, instead of checking the display checkbox 215, by operating the input unit 22, the vehicle is selected. In this case, if the vehicle information 214 of any one vehicle T is selected, the display control unit 114 displays the vehicle as a display target at the center of the map image 211.

Further, the display control unit 114 displays detail information 217 of the vehicle T in an area of the map image 211 close to the icon image 212 of the vehicle T disposed at the center. The detail information 217 is arbitrary information (in the example of FIG. 4, the vehicle number, the name of a crew, the vehicle velocity, the revolving speed, and the temperature) of the vehicle-specific information read out from the storage unit 12 and the status information acquired by the status acquiring unit 112. The user may arbitrarily set the kinds of information to be displayed as detail information 217, by operating the input unit 22. According to this configuration, since a vehicle T which the user is giving attention to is disposed at the center of the map image 211, the user can easily recognize the vehicle T. Also, since detail information 217 is displayed near the vehicle T disposed at the center, the user can easily see the contents of the detail information 217.

Furthermore, the display control unit 114 displays a mark A indicating the traveling direction of the vehicle T disposed at the center, near the icon image 212 of the vehicle T on the map image 211. The traveling direction of the vehicle T is acquired from the status information acquired by the status acquiring unit 112. In this example, as the mark A, an arrow is displayed; however, the mark A is not limited thereto, and an arbitrary mark capable of indicating the traveling direction of the vehicle T may be displayed. The mark A makes the user visually understand the traveling direction of the vehicle T which the user is giving attention to.

In the case where the location of the vehicle T disposed at the center has changed, the display control unit 114 changes the display range of the map image 211 while the position of the icon image 212 is maintained at the center, such that the movement of the vehicle T is reflected. In other words, the display control unit 114 moves the display range of the map image 211, instead of moving the icon image 212 of the vehicle T. Therefore, even in the case where the vehicle T which the user is giving attention to has moved, it is possible to maintain the vehicle at the position which the user can easily see.

Flow Chart of Display Control Method

Figure 5:
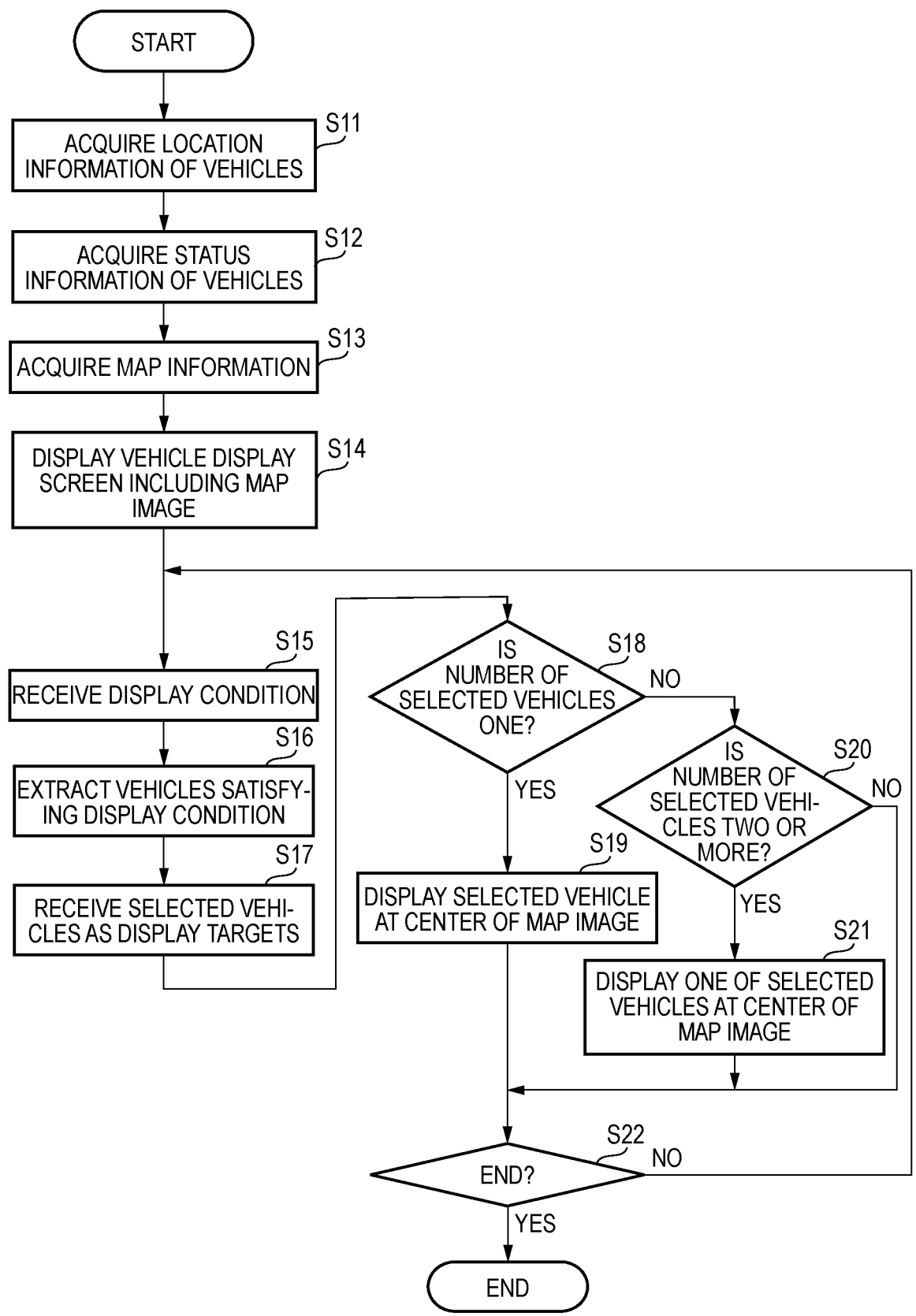
FIG. 5 is a view illustrating a flow chart of a display control method according to the first embodiment.

FIG. 5 is a view illustrating a flow chart of a display control method which is performed by the display control device 1. The flow chart of FIG. 5 is started, for example, if the user performs a predetermined operation on the user terminal 2 by operating the input unit 22.

At intervals of a predetermined time, the location acquiring unit 111 acquires location information representing the locations of the vehicles T and the measurement times of the locations, from the vehicles T, and stores the location information in the storage unit 12 (Step S11). At intervals of a predetermined time, the status acquiring unit 112 acquires status information representing the statuses of the vehicles T from the vehicles T, and stores the status information in the storage unit 12 (Step S12). The order of Steps S11 and S12 may be changed, or Steps S11 and S12 may be performed in parallel.

The map acquiring unit 113 acquires the map information for displaying the map image by reading the storage unit 12 (Step S13).

The display control unit 114 reads out the vehicle-specific information, the location information, and the status information of the vehicles T from the storage unit 12, and transmits the read information to the user terminal 2, such that a vehicle display screen displaying the information on the vehicles T is displayed on the display unit 21 of the user terminal 2 (Step S14). At this time, the display control unit 114 transmits the map information acquired in Step S13, to the user terminal 2, such that the map image based on the map information is displayed on the vehicle display screen of Step S14.

If the user inputs a display condition in any of the display condition fields 216 by operating the input unit 22, the input unit 22 transmits the input content as input information to the display control device 1. The setting receiving unit 115 of the display control device 1 receives the display condition set by the user, based on the input information received from the user terminal 2 (Step S15).

The display control unit 114 extracts a vehicle T satisfying the display condition received in Step S15, and displays the vehicle information 214 of the extracted vehicle T in a display mode different from a display mode of the other vehicles T (Step S16).

If the user checks the display checkbox 215 of a vehicle T by operating the input unit 22, the input unit 22 transmits the input content as input information to the display control device 1. The setting receiving unit 115 of the display control device 1 receives the vehicle T selected by the user, as a display target, based on the input information received from the user terminal 2 (Step S17).

In the case where the number of vehicles T selected in Step S17 is one ("YES" in Step S18), the display control unit 114 displays the icon image 212 of the selected vehicle T at the center of the map image 211 (Step S19). At this time, the display control unit 114 displays the detail information 217 of the vehicle T disposed at the center, and a mark A indicating the traveling direction, near the icon image 212 of the vehicle T.

In the case where the number of vehicles T selected in Step S17 is two or more ("NO" in Step S18 and "YES" in Step S20), the display control unit 114 selects one vehicle T from the plurality of vehicles T according to a predetermined rule, and displays the selected vehicle at the center of the map image 211 (Step S21). At this time, the display control unit 114 displays the detail information 217 of the vehicle T disposed at the center, and a mark A indicating the traveling direction, near the icon image 212 of the vehicle T.

In the case where no vehicle T is selected in Step S17 ("NO" in Step S18 and "NO" in Step S20), the display control unit 114 does not perform Steps S19 and S21.

In the case where a predetermined end condition (for example, a condition that the user should perform a predetermined end operation on the user terminal 2 by operating the input unit 22) is not satisfied ("NO" in Step S22), the process from Step S15 is repeated. In the case where the predetermined end condition is satisfied ("YES" in Step S22), the process is finished.

The display control device 1 according to the present embodiment displays a vehicle T satisfying display conditions set by the user, at the center of the map image. Therefore, the user can easily recognize the vehicle T which the user is giving attention to. Also, since detail information 217 is displayed near the vehicle T disposed at the center, the user can easily see the contents of the detail information 217.

Second Embodiment

In the first embodiment, in the case where there is a plurality of vehicles T satisfying display conditions, one of the vehicles T is disposed at the center of the map image 211. However, in the present embodiment, a middle location of the plurality of vehicles T is disposed at the center of the map image 211. The other configuration and the other process are the same as those of the first embodiment.

Description of Center Point

Figure 6:
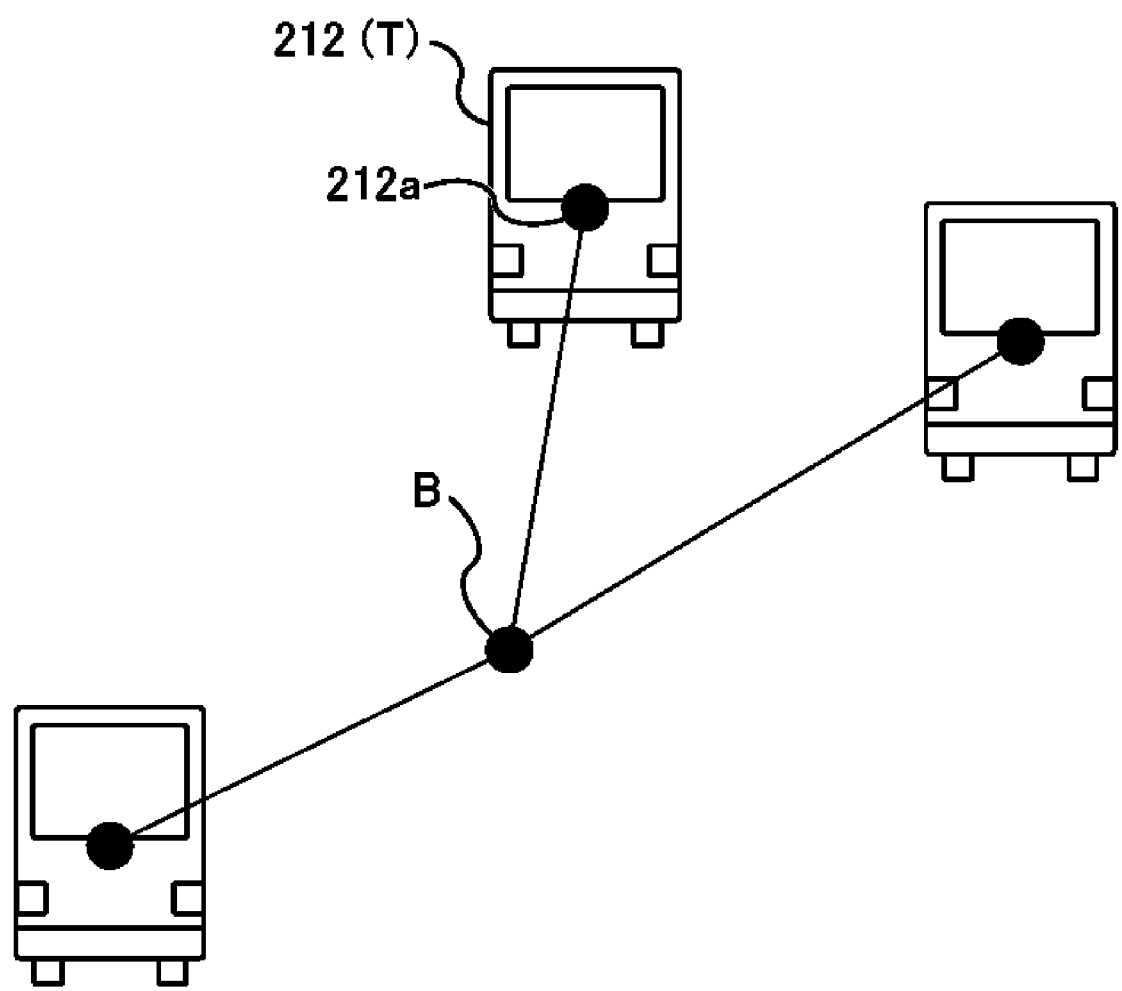
FIG. 6 is a schematic diagram illustrating the center point of a plurality of vehicles.

FIG. 6 is a schematic diagram illustrating the center point B of a plurality of vehicles T. FIG. 6 shows three icon images 212 of three vehicles T to be displayed on the map image 211. However, the number of vehicles is not limited to three, and may be an arbitrary number of 2 or greater.

The icon images 212 are displayed on positions corresponding to the locations 212a of the vehicles T, respectively. The display control unit 114 calculates the center point B (the middle location) from the locations 212a of the plurality of vehicles T by a predetermined method. For example, the display control unit 114 may use a point equidistant from the locations 212a of the plurality of vehicles T (in the case where the number of vehicles T is three, the circumcenter thereof) as the center point B of the plurality of vehicles T. Alternatively, the display control unit 114 may use a point whose coordinates are the mean values of the coordinates of the locations 212a of the plurality of vehicles T, as the center point B of the plurality of vehicles T. Also, the display control unit 114 may use a point whose X coordinate is the mean value of the largest X coordinate and the smallest X coordinate of the locations 212a of the plurality of vehicles T and whose Y coordinate is the mean value of the largest Y coordinate and the smallest Y coordinate, as the center point B of the plurality of vehicles T. However, the definition of the center point B is not limited to those, and an arbitrary point representing a middle location of the locations 212a of the plurality of vehicles T can be used.

Description of Configuration for Displaying Information on Vehicles T

Figure 7:
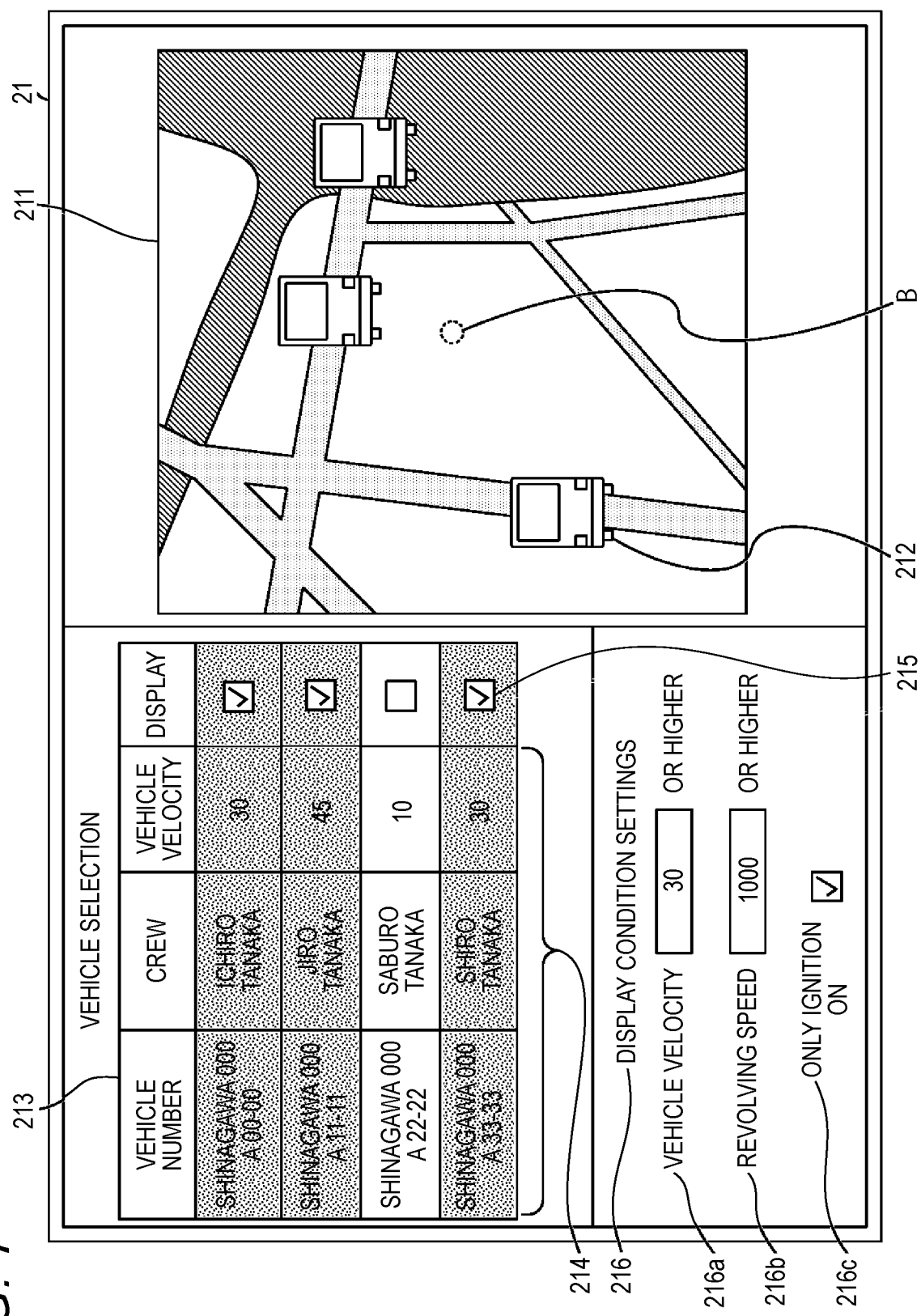
FIG. 7 is a front view illustrating the display unit displaying a vehicle display screen according to the first embodiment.

FIG. 7 is a front view illustrating the display unit 21 displaying a vehicle display screen after display condition setting. The vehicle display screen of FIG. 7 is displayed in the case where display conditions are set on the vehicle display screen of FIG. 3 and a plurality of vehicles T satisfying the display conditions is extracted.

The display control unit 114 extracts the plurality of vehicles T satisfying the display conditions, and displays the vehicle information 214 of the plurality of extracted vehicles T included in the vehicle list 213, in a display mode different from that of the vehicle information 214 of the other vehicles T (in FIG. 7, corresponding areas are displayed in a different color). The method of changing the display mode of the vehicle information 214 is the same as that of the first embodiment.

The user checks the display checkboxes 215 of vehicles T which are display targets and unchecks the display checkboxes 215 of vehicles T which are not display targets, by operating the input unit 22. In this way, the user can select vehicles T to be displayed. Alternatively, the display control unit 114 may automatically check the display checkboxes 215 of vehicles T satisfying the display conditions.

In the case where the number of vehicles T selected by the user's checking on their display checkboxes 215 is two or more, the display control unit 114 calculates the center point B of the plurality of selected vehicles T by the above-mentioned method. Then, the display control unit 114 disposes the icon images 212 of the plurality of vehicles T on the map image 211 such that the calculated center point B is positioned at the center of the map image 211. Here, the center of the map image 211 means the center of the display range of the map image 211 or an area close to the center. In the example of FIG. 7, the display control unit 114 displays a mark representing the center point B on the map image 211; however, it may not display that mark.

In this case, the display control unit 114 sets a range including the locations of all of the vehicles T selected by the user, as the display range of the map image 211. Also, the display control unit 114 sets such a maximum scale which a range including the locations of all of the vehicles T selected by the user can fit on the vehicle display screen (i.e. the largest scale), as the scale of the map image 211.

In the case where the number of vehicles T selected by the user's checking on their display checkboxes 215 is one, the display control unit 114 displays the vehicle display screen shown in FIG. 4, and disposes the selected vehicle T at the center of the map image 211.

Flow Chart of Display Control Method

Figure 8:
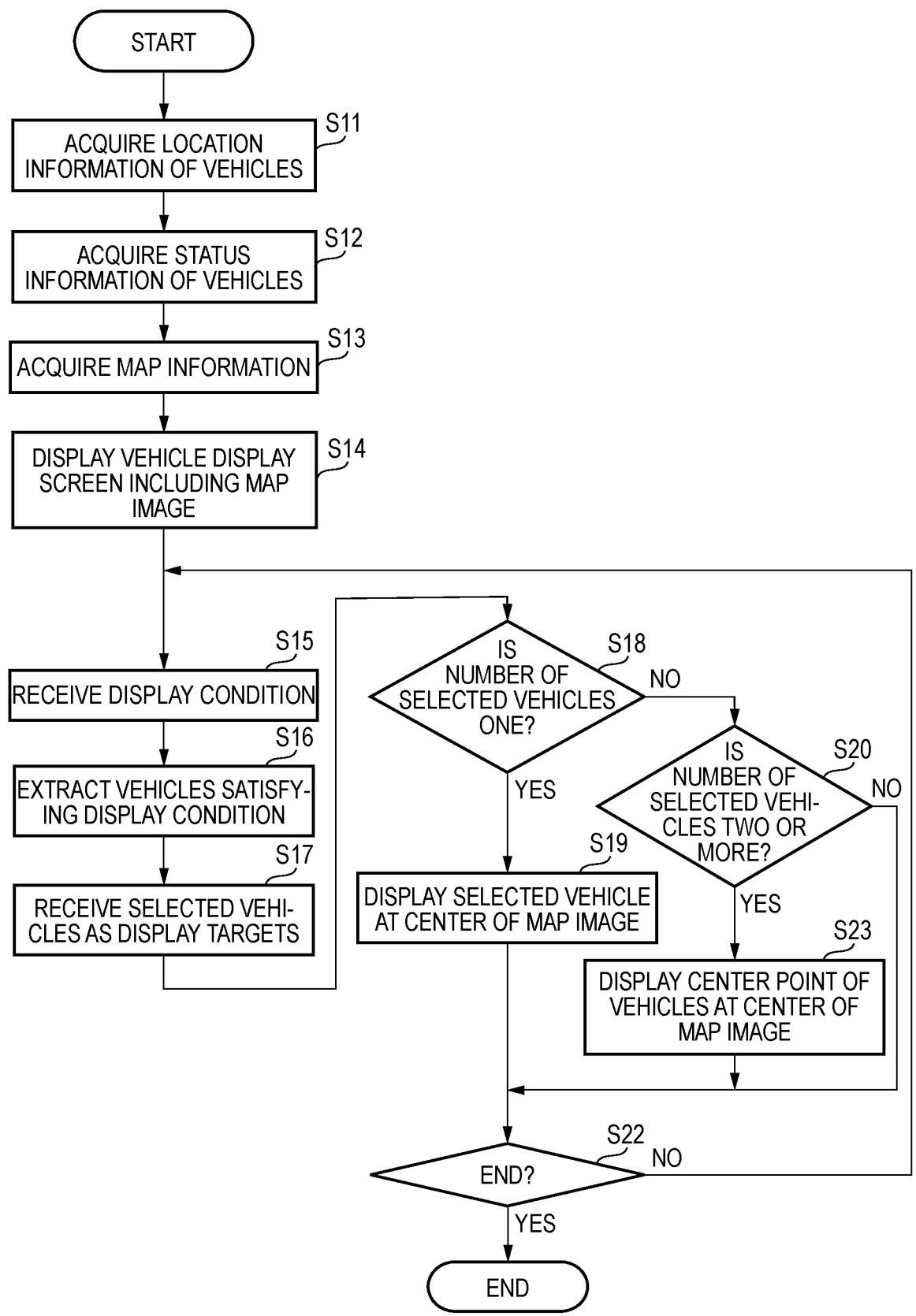
FIG. 8 is a view illustrating a flow chart of a display control method according to a second embodiment.

FIG. 8 is a view illustrating a flow chart of a display control method which is performed by the display control device 1. The flow chart of FIG. 8 has Step S23 in place of Step S21 of the flow chart of FIG. 5. The other steps are identical to those of the flow chart of FIG. 5, and thus a description thereof will not be made below.

In the case where the number of vehicles T selected in Step S17 is two or more ("NO" in Step S18 and "YES" in Step S20), the display control unit 114 calculates the center point B of them by the predetermined method, and displays the icon images 212 of the plurality of vehicles T on the map image 211 such that the calculated center point B is positioned at the center of the map image 211 (Step S23).

As described above, in the present embodiment, since the icon images 212 of the plurality of vehicles T satisfying the display conditions are disposed such that the center point B of the vehicles T is positioned at the center of the map image 211, the user can easily see the distribution of the plurality of vehicles T which the user is giving attention to. Further, since the display range and scale of the map image 211 are set such that the plurality of vehicles T is included within the display range, it is possible to display the plurality of vehicles T which the user is giving attention to, at the same time.

Although the disclosure has been described above using the embodiments, the technical scope of the disclosure is not limited to the scope of the above-described embodiments. It should be apparent to those skilled in the art that various changes or improvements can be made to the above-described embodiments. It is apparent from the description of the appended claims that implementations including such changes or improvements are encompassed in the technical scope of the disclosure.

The present invention provides illustrative, non-limiting examples as follows:

According to a first aspect of the disclosure, there is provided a display control device including: an acquiring unit configured to acquire location information items representing locations of each of a plurality of vehicles and a plurality of status information items representing statuses of each of the plurality of vehicles, the plurality of vehicles being registered in advance in association with a user using a user terminal; a setting receiving unit configured to receive a display condition set by the user; and a display control unit configured to display a map image on the user terminal such that an icon image representing a vehicle whose status information item satisfies the display condition is positioned at the center of the map image and a position of the icon image of the vehicle in the map image corresponds to the location of the vehicle represented by the location information item.

According to a second aspect of the disclosure, there is provided the display control device according to the first aspect, wherein the display control unit is configured to display a list on the user terminal, the list including vehicle information items in which a plurality of vehicle-specific information items for specifying the plurality of vehicles and the plurality of status information items corresponding to the plurality of vehicles are associated with each other, and the list being displayed such that the vehicle information item of the vehicle whose status information item satisfies the display condition is shown in a display mode different from a display mode by which the vehicle information items of other vehicles are shown, and wherein, after displaying the list on the user terminal, the display control unit is configured to display the map image on the user terminal such that the icon image which represents a vehicle corresponding to a vehicle information item selected from the list on the user terminal is positioned at the center of the map image.

According to a third aspect of the disclosure, there is provided the display control device according to the second aspect, wherein the status information items acquired by the acquiring unit include velocities of each of the plurality of vehicles, wherein the display condition received by the setting receiving unit includes a velocity range, and wherein the display control unit is configured to display the list on the user terminal such that the vehicle information item of a vehicle whose velocity information item represents a velocity included within the velocity range is shown in a display mode different from a display mode by which the vehicle information items of other vehicles are shown.

According to a fourth aspect of the disclosure, there is provided the display control device according to the second aspect, wherein the status information items acquired by the acquiring unit include engine information items representing engine speeds of each of the plurality of vehicles, wherein the display condition received by the setting receiving unit includes an engine speed range, and wherein the display control unit is configured to display the list on the user terminal such that the vehicle information item of a vehicle whose engine information item represents an engine speed included within the engine speed range is shown in a display mode different from a display mode by which the vehicle information items of other vehicle are shown.

According to a fifth aspect of the disclosure, there is provided the display control device according to the second aspect, wherein the status information items acquired by the acquiring unit include ignition information items representing ignition statuses of the plurality of vehicles, wherein the display condition received by the setting receiving unit includes an ignition status indicating display target, and wherein the display control unit displays the list on the user terminal such that only a vehicle which corresponds to an ignition information item representing an ignition status indicating display target is included in the list.

According to a sixth aspect of the disclosure, there is provided the display control device according to the first aspect, wherein the display control unit is configured to display the map image on the user terminal such that a middle position of a plurality of icon images representing a plurality of vehicles whose status information items satisfy the display condition is positioned at the center of the map image.

According to a seventh aspect of the disclosure, there is provided the display control device according to the sixth aspect, wherein the display control unit is configured to display the map image on the user terminal at a range and scale by which the map image includes the icon images representing the plurality of vehicles whose status information items satisfy the display condition.

According to an eighth aspect of the disclosure, there is provided the display control device according to the first aspect, wherein, in a case where the location of the vehicle whose icon image is displayed at the center of the map image has changed, the display control unit changes a display range of the map image while maintaining the icon image of the vehicle at the center of the map image.

According to a ninth aspect of the disclosure, there is provided a display control method including: acquiring location information items representing locations of each of a plurality of vehicles and a plurality of status information items representing statuses of each of the plurality of vehicles, the plurality of vehicles registered in advance in association with a user using a user terminal; receiving a display condition set by the user; and displaying a map image on the user terminal such that an icon image representing a vehicle whose status information item satisfies the display condition is positioned at the center of the map image and a position of the icon image of the vehicle in the map image corresponds to the location of the vehicle represented by the location information item.

According to a tenth aspect of the disclosure, there is provided a display control system including: a user terminal; and a display control device configured to display a status of a vehicle on the user terminal, wherein the display control device includes: an acquiring unit configured to acquire location information items representing locations of each of a plurality of vehicles and a plurality of status information items representing the statuses of each of the plurality of vehicles, the plurality of vehicles being registered in advance in association with a user using the user terminal; and a setting receiving unit configured to receive a display condition set by the user, and wherein the user terminal includes a display unit configured to display a map image such that an icon image representing a vehicle whose status information item satisfies the display condition is positioned at the center of the map image and a position of the icon image of the vehicle in the map image corresponds to the location of the vehicle represented by the location information item.

What is claimed is:

1. A display control device comprising:
an acquiring unit configured to acquire location information items representing locations of each of a plurality of vehicles and a plurality of status information items representing statuses of each of the plurality of vehicles, the plurality of vehicles being registered in advance in association with a user using a user terminal;
a setting receiving unit configured to receive a display condition set by the user; and
a display control unit configured to, when the status information item of one vehicle satisfies the display condition, display a map image on the user terminal such that an icon image representing the one vehicle positioned at the center of the map image and a position of the icon image of the one vehicle in the map image corresponds to the location of the one vehicle represented by the location information item,
wherein the display control unit is configured to, when the status information item of the plurality of vehicles satisfy the display condition, display the map image on the user terminal such that a middle position of a plurality of icon images representing the plurality of vehicles is positioned at the center of the map image and positions of the plurality of icon images of the plurality of vehicles in the map image corresponds to locations of the plurality of vehicles represented by the location information item,
wherein, when at least one icon image of the plurality of icon images is moved, a display area of the map image is changed such that the middle position is disposed at a center of the display area.

2. The display control device according to claim 1,
wherein the display control unit is configured to display a list on the user terminal, the list including vehicle information items in which a plurality of vehicle-specific information items for specifying the plurality of vehicles and the plurality of status information items corresponding to the plurality of vehicles are associated with each other, and the list being displayed such that the vehicle information item of the vehicle whose status information item satisfies the display condition is shown in a display mode different from a display mode by which the vehicle information items of other vehicles are shown, and
wherein, after displaying the list on the user terminal, the display control unit is configured to display the map image on the user terminal such that the icon image which represents a vehicle corresponding to a vehicle information item selected from the list on the user terminal is positioned at the center of the map image.

3. The display control device according to claim 2,
wherein the status information items acquired by the acquiring unit include velocities of each of the plurality of vehicles,
wherein the display condition received by the setting receiving unit includes a velocity range, and
wherein the display control unit is configured to display the list on the user terminal such that the vehicle information item of a vehicle whose velocity information item represents a velocity included within the velocity range is shown in a display mode different from a display mode by which the vehicle information items of other vehicles are shown.

4. The display control device according to claim 2,
wherein the status information items acquired by the acquiring unit include engine information items representing engine speeds of each of the plurality of vehicles,
wherein the display condition received by the setting receiving unit includes an engine speed range, and
wherein the display control unit is configured to display the list on the user terminal such that the vehicle information item of a vehicle whose engine information item represents an engine speed included within the engine speed range is shown in a display mode different from a display mode by which the vehicle information items of other vehicle are shown.

5. The display control device according to claim 2,
wherein the status information items acquired by the acquiring unit include ignition information items representing ignition statuses of the plurality of vehicles,
wherein the display condition received by the setting receiving unit includes an ignition status indicating display target, and wherein the display control unit displays the list on the user terminal such that only a vehicle which corresponds to an ignition information item representing an ignition status indicating display target is included in the list.

6. The display control device according to claim 1, wherein the display control unit is configured to display the map image on the user terminal at a range and scale by which the map image includes the icon images representing the plurality of vehicles whose status information items satisfy the display condition.

7. The display control device according to claim 1, wherein, in a case where the location of the vehicle whose icon image is displayed at the center of the map image has changed, the display control unit changes a display range of the map image while maintaining the icon image of the vehicle at the center of the map image.

8. A display control method comprising:
acquiring location information items representing locations of each of a plurality of vehicles and a plurality of status information items representing statuses of each of the plurality of vehicles, the plurality of vehicles registered in advance in association with a user using a user terminal;
receiving a display condition set by the user; and
displaying a map image on the user terminal such that, when the status information item of one vehicle satisfies the display condition, an icon image representing the vehicle is positioned at the center of the map image and a position of the icon image of the one vehicle in the map image corresponds to the location of the one vehicle represented by the location information item,
wherein the displaying the map image on the user terminal is performed such that, when the status information item of the plurality of vehicles satisfy the display condition, a middle position of the plurality of icon images representing a plurality of vehicles is positioned at the center of the map image and positions of the plurality of icon images of the plurality of vehicles in the map image corresponds to locations of the plurality of vehicles represented by the location information item, and when at least one icon image of the plurality of icon images is moved, changing a display area of the map image such that the middle position is disposed at the center of a center of the display area.

9. A display control system comprising:
a user terminal; and
a display control device configured to display a status of a vehicle on the user terminal,
wherein the display control device includes:
an acquiring unit configured to acquire location information items representing locations of each of a plurality of vehicles and a plurality of status information items representing the statuses of each of the plurality of vehicles, the plurality of vehicles being registered in advance in association with a user using the user terminal; and
a setting receiving unit configured to receive a display condition set by the user,
wherein the user terminal includes a display unit configured to, when the status information item of one vehicle satisfies the display condition, display a map image such that an icon image representing the one vehicle is positioned at the center of the map image and a position of the icon image of the one vehicle in the map image corresponds to the location of the one vehicle represented by the location information item, and
wherein the display control unit is configured to, when the status information item of the plurality of vehicles satisfy the display condition, display the map image on the user terminal such that a middle position of a plurality of icon images representing the plurality of vehicles whose status information items satisfy the display condition is positioned at the center of the map image and positions of the plurality of icon images of the plurality of vehicles in the map image corresponds to locations of the plurality of vehicles represented by the location information item,
wherein, when at least one icon image of the plurality of icon images is moved, a display area of the map image is changed such that the middle position is disposed at a center of the display area.

* * * * *